United States Patent [19]

Negishi

[11] Patent Number: 5,444,819

[45] Date of Patent: Aug. 22, 1995

[54] ECONOMIC PHENOMENON PREDICTING AND ANALYZING SYSTEM USING NEURAL NETWORK

[75] Inventor: Michiro Negishi, Kamakura, Japan

[73] Assignee: Mitsubishi Denki Kabushiki Kaisha, Tokyo, Japan

[21] Appl. No.: 53,143

[22] Filed: Apr. 27, 1993

[30] Foreign Application Priority Data

Jun. 8, 1992 [JP] Japan .................. 4-147497

[51] Int. Cl.⁶ .............................................. G06F 15/18
[52] U.S. Cl. ...................................... 395/22; 395/23; 395/24; 364/402
[58] Field of Search ............................. 395/22, 23, 24; 364/401, 402

[56] References Cited

U.S. PATENT DOCUMENTS 5,060,278 10/1991 Fukumizu ............................... 395/22
5,109,475 4/1992 Kosaka et al. ......................... 395/22
5,140,523 8/1992 Frankel et al. ........................ 395/22

OTHER PUBLICATIONS

An Intelligent Trend Prediction and Reversal Recognition System Using Dual-Module Neural Networks Gia-Shuh Jang IEEE/ 9–11 Oct. 1991.
Stock Market Prediction System with Modular Neural Networks T. Kimoto et al., IEEE/ 17–21 Jun. 1990.
A 3D Neural Net for Business Forecasting F. S. Wong IEEE/ 8–1 Jan. 1991.
TME Series Prediction by Adaptive Networks: A Dynamical Systems Perspective D. Lowe et al., IEEE/ Feb. 1991.
Commodity Trading with a Two Year Old Collard, IEEE Jul. 1991.
IEEE "IJCNN International Joint Conference on Neural Networks" Vol. 1 Jun. 1990.

*Primary Examiner*—Robert W. Downs
*Assistant Examiner*—Richemond Dorvil
*Attorney, Agent, or Firm*—Wolf, Greenfield & Sacks

[57] ABSTRACT

An economic phenomenon predicting and/or analyzing system using a neural network. In the disclosed system, time series data indicating economic phenomena are input to preparation modules, and moving-average values and their differences are generated. One of the preparation modules performs a predetermined process over the time series data indicating an economic phenomenon, i.e. the change of TOPIX, to remove trends. A pattern sorter sorts the trend-free data into a certain number of groups. Average values of various time series data, their differences and the result of pattern sorting are input to input layer neurons of the network. The network is provided in advance with learning information of the change of TOPIX in the past. The output of the output layer neurons will be a value of prediction of the change of TOPIX. For the output of hidden layer neurons, principal components are obtained by principal analysis modules. A correlation analysis module obtains a distribution of frequency of principal component rankings and analyzes the correlation between the explanation variants and the output of the neural network based on the obtained distribution of frequency.

34 Claims, 2 Drawing Sheets

ECONOMIC PHENOMENON PREDICTING AND ANALYZING SYSTEM USING NEURAL NETWORK

BACKGROUND OF THE INVENTION

1. Field of the Invention

This invention relates to a system for predicting and analyzing economic phenomena, such as variations in stock prices, bond prices and exchange rates, using a neural network.

2. Description of the Related Art

Figure 2:
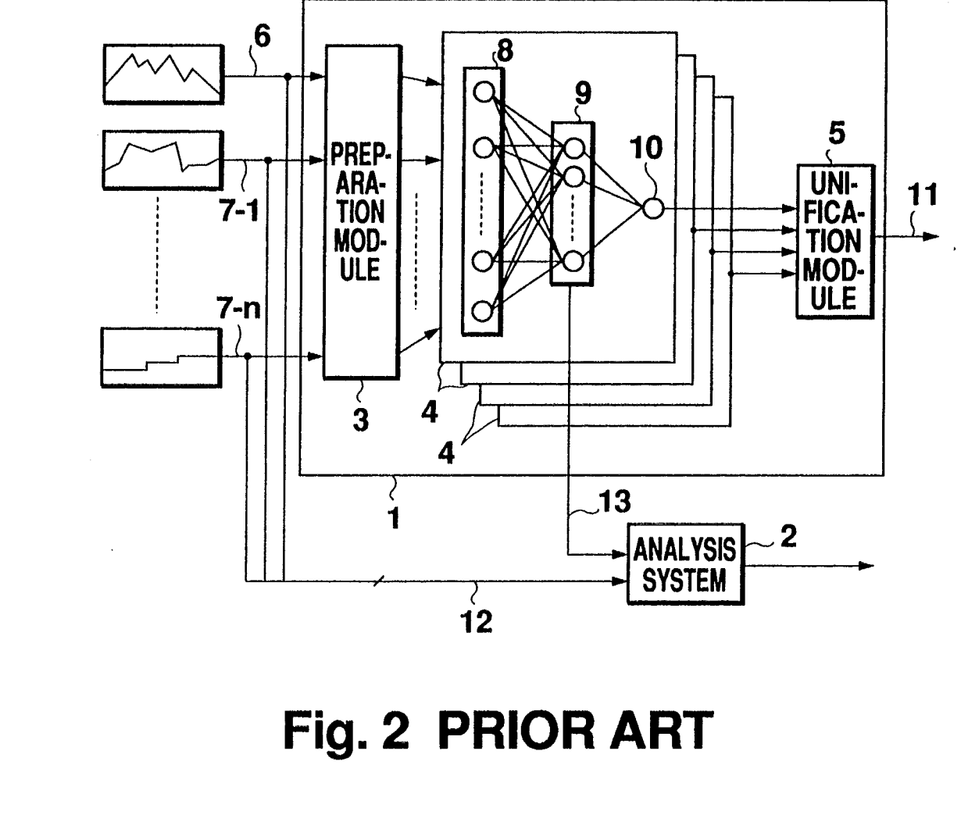
FIG. 2 is a diagram showing an economic phenomenon predicting and analyzing system, using neural networks, according to the conventional art.

FIG. 2 of the accompanying drawings shows an economic phenomenon predicting and analyzing system, which is disclosed in, for example, "Stock Market Prediction System with Modular Neural Networks", by T. Kimoto and K. Asakawa, in Proceedings of International Joint Conference on Neural Networks, June 1990. This system predicts variations in TOPIX and analyzes causes for the variations. TOPIX (Tokyo Stock Exchange Prices Index) is a kind of stock index used in Japan and is a stock index for stock on the market in Japan.

This system comprises two subsystems: a prediction system 1 and an analysis system 2. The prediction system 1 is composed of a preparation module 3, a number of neural networks 4 connected to the back stage of the preparation module 3, and an unification module 5 for obtaining a weighted average of the outputs of the neural networks 4.

The preparation module. 3 inputs time series data 6 indicating the time variation of TOPIX in a predetermined past period. The preparation module 3 further inputs various time series data 7-1–7-n indicating the past time variations such as of turnover, interest rate, foreign exchange rate and New York Dow-Jones average. Moreover the preparation module 3 performs a logarithmic arithmetic operation and a normalization arithmetic, an error function arithmetic on the input time series data and then supplies them to the individual neural networks Each neural network 4 has an hierarchical structure including an input layer 8, a hidden layer 9 and an output layer. In FIG. 2, each of the output layers is composed of a single output neuron 10.

Each neural network 4 cannot be used for prediction until it is provided with learning. The learning of the neural network 4 is provided according to a so-called back propagation method. During this process, learning data including two kinds of data, i.e. input data and teaching data have to be given to the neural network 4.

Data indicating economic phenomena that have actually occurred in the past are used as the input data, and data indicating economic phenomena that have actually occurred following the past economic phenomena are used as the teaching data. More specifically, the input data are time series data indicating variations of TOPIX in a period and data indicating variations such as of turnover, interest rate, foreign exchange rate and New York Dow-Jones average in the same period, and the teaching data are data indicating actual variations of TOPIX in a period following the previous period.

In the system of FIG. 2, since the preparation module 3 is located on the front stage of the neural network 4, the time series data indicating variations of TOPIX of the input data are given to the preparation module 3 as input data 6 and are then input to the neural network 4. Likewise, of the input data, the time series data indicating variations such as of turnover, interest rate, foreign exchange rate and New York Dow-Jones average are given to the preparation module 3 as input data 7-1–7-n and are then input to the neural network 4.

For learning, all prepared learning data is repeatedly input to the neural networks 4. As all learning data is thus repeatedly given according to the back propagation method, the individual neural network 4 is self-organized. Upon termination of this learning, the individual neural network 4 will be an organization which is provided with learning of past economic phenomena by experience. Therefore, after termination of the learning process, the economic time series data 6, 7-1-7-n are given successively to the preparation module 3 so that the result of prediction of a future economic phenomenon based on the experience of the past economic phenomena can be obtained from the neural networks 4 via the unification module 5.

The unification module 5 calculates the weighted average of the outputs of the output neurons 10 of the individual neural networks 4. Specifically, the unification module 5 performs the following arithmetic operation:

Firstly, the rate of increase of TOPIX at a time t is represented by TOPIX (t)/TOPIX (t−1), where TOPIX (t) is a stock index at a week t. The unification module 5 obtains a logarithm, usually a natural logarithm, of this value. In other words, $\gamma_t$ is obtained by the equation (1):

$$\gamma_t = ln(\text{TOPIX}(t)/\text{TOPIX}(t-1)) \quad (1)$$

Secondly, return $\gamma_N(t)$ at a time t is obtained using the following equation (2):

$$\gamma_N(t) = \Sigma \phi^1 \gamma_{t+1} (i=1, ...N) \quad (2)$$

where $\phi^1$ is the weight of a natural logarithm $\gamma_{t+1}$ of the rate of increase of TOPIX at a time t+i. $\phi^1$ is determined within a range of 0.5 to 1, and so as to decrease as i is large. Since "i is large" means "it is a distant future", the equation (2) is a weighted average operating equation which evaluates the return $\gamma_N(t)$ to be smaller as it is a more distant future. The unification module 5 outputs the return $\gamma_N(t)$ to be obtained as the result of this weighting arithmetic operation.

Accordingly, the output 11 of the unification module 5 will be an index indicating the rate of increase of weighted average of TOPIX in a predetermined period after the present time. This value will be positive if the stock price increases in the future and negative if the stock price decreases in the future. From the unification module 5, the return $\gamma_N(t)$ as significant data for estimating economic trends from the present time (after a time t) can be obtained as the output 11. A period to give the data 6, 7-1-7-n to the prediction system 1 should preferably be a week.

Further, the above-identified publication discloses a method of analizing the causal relationship between the time series input data 6, 7-1-7-n and the output value 11 using the individual neural networks 4 provided with learning. In this method, the number of neurons of each hidden layer 9 is predetermined to be small (e.g., five). For analizing the causal relationship between the time series input data 6, 7-1-7-n and the output of the individual neural networks 4 the time series input data 6, 7-1-7-n for learning are input to the analysis system 2 as input data 12 and corresponding outputs of the individual hidden layers 9 are input to the analysis system 2 as hidden multivariate analysis is performed over the input data 12 as independent variables and outputs 13 as dependent variables. Specifically, a cluster analysis is made over vectors of the outputs 13 of the individual hidden layers 9. In the learning process to give various learning data 12, the similar outputs 13 for different learning data 12 can be obtained from the hidden layers 9. The set of such learning data is called a cluster. The analysis system 4 is a system for obtaining the causal relation between the time series input data 6, 7-1-7-n and the output value 11 by sorting the clusters.

Generally, the greater the number of neurons constituting each of the hidden layers 9, the higher the degree of prediction accuracy of the prediction system 1 that will be obtained. On the other hand, when the number of neurons constituting each of the hidden layers 9 is set as many clusters to cluster, redundancy will be eliminated, and therefore a cluster analysis using the outputs 13 of the hidden layers 9 as shown in FIG. 2 will become easy. The number of clusters is usually several and hence the number of neurons of each of the hidden layers 9 is determined to be small so as to meet the number of clusters. Thus the redundant neurons are eliminated.

This analysis system 2 is convenient for providing a detailed analysis of economic phenomena. Specifically, by researching the learning data 12 sorted into individual clusters by the analysis system 2, a more detailed analysis of economic phenomena can be achieved. For example, by researching the date of the learning data 12 belonging to the individual cluster on the time series data of stock indices, it is possible to determine the kind of market (i.e., a bull market, a stagnant market and a bear market) corresponding to the cluster. Further, by researching the frequency distribution of the input data (learning data) belonging to the individual cluster, it is possible to research the main factor of occurrence of market trends corresponding to the individual cluster. Namely, assuming that the only input data (learning data 12) sorted into this cluster, are data which belong to the input data (learning data 12) in a predetermined distribution, it can be considered that if the content is deviated, the values of the input data (learning data 12) near the deviated input data are ones of the factors occurrence of market trends corresponding to the cluster.

In the prior system, it is preferable that the number of neurons constituting each of the hidden layers is as many as the clusters to which the learning data is to be sorted. However, it is possible to anticipate how many clusters the input data should actually be sorted into. Therefore, the number of neurons has to be determined by a trial-and-error experimental method.

Since the number of clusters is only a few, the number of hidden layer neurons was restricted in order to satisfy the demand of the analysis system. However, to improve the prediction performance, the number of hidden layer neurons is preferably large. In the prior system, therefore, demands for removing redundant neurons by the analysis system have been the bottle-neck in improving the prediction performance.

Further, with the prior system, analyses such as a technical analysis could not be performed. A technical analysis, like fundamental analysis, is one of the classic economic analyses and a method for checking variation patterns of stock prices in the past using, for example, a chart and grasping variations of stock prices after the present using the past variations. This method adopts the conventional statistic method and enables the obtaining of the causal relation between the variations of input data and the output. However, with the prior system using neural networks, since the technical analysis could not be performed, the causal relationship between the past variation pattern and the future variation and the causal relation between the variations of input data and the output would not be obtained.

SUMMARY OF THE INVENTION

A first object of this invention is to provide an economic phenomenon predicting and/or analyzing system using neural networks which enables the determination of the number of hidden layer neurons without using a trial-and-error experimental method.

A second object of the invention is to provide an economic phenomenon predicting and/or analyzing system which enables the increase of the number of hidden layer neurons of predicting neural networks, thereby improving the prediction performance.

A third object of the invention is to provide an economic phenomenon predicting and/or analyzing system which enables the obtaining of the causal relationship between the past variation patterns and possible variations and the causal relationship between input data variations and outputs, thus enabling a technical analysis.

According to a first aspect of the invention, there is provided a neural network, for predicting economic phenomena, comprising:

(a) an input layer having a plurality of input layer neurons for inputting signals indicating respective economic phenomena;

(b) a predetermined number of hidden layers having a plurality of hidden layer neurons, respectively, each of said input neurons being adapted to make synaptic combinations with arbitrary ones of the hidden layer neurons; and (c) an output layer having a predetermined number of output layer neurons, each of said hidden layer neurons being adapted to make synaptic combinations with arbitrary ones of the output layer neurons, each of the output layer neurons being adapted to output a signal;

(d) wherein weights of the synaptic combinations between the input layer neurons and hidden layer neurons and weights of the synaptic combinations between the hidden layer neurons and said output layer neurons are organized by learning in such a manner that when fundamental analysis data and technical analysis data are input to the input layer neurons represent a result of prediction of the economic phenomenon.

In the neural network having the above-mentioned construction, when predicting an economic phenomenon, information for fundamental analysis and that for technical analysis are input to the input layer neurons. The neural network is provided in advance with learning by the fundamental analysis and technical analysis information obtained in the past as well as information concerning the objective economic phenomenon corresponding to these past data. Therefore the output of the output layer neuron is the result of prediction based on both the fundamental analysis information and the technical analysis information. Further, it is possible to perform a principal analysis based on the structure of the hidden layer (i.e., the weighting of synaptic combination with the output layer neurons).

According to a second aspect of the invention, there is provided a neural network for predicting economic phenomena, comprising:

(a) an input layer having a plurality of input layer neurons for inputting signals indicating respective economic phenomena;

(b) a predetermined number of hidden layers having respective hidden layer neurons, each of said input neurons being adapted to make a synaptic combination with an arbitrary one of said hidden layer neurons;

(c) an output layer having a predetermined number of output layer neurons, each of said hidden layer neurons being adapted to make a synaptic combination with an arbitrary one of said output layer neurons, each of said output layer neurons being adapted to output a signal; and (d) weighting of the synaptic combinations between said input layer neurons and hidden layer neurons and weighting of the synaptic combinations of said hidden layer neurons and output layer-neurons being organized by leaning such a manner that when data indicating variations of various principal economic indices including an economic phenomenon to be predicted and data indicating a variation pattern of the economic phenomenon to be predicted are input to the input layer neurons, said signal output from said output layer neurons represents a result of prediction of the economic phenomenon.

In the neural network having this construction, when predicting an economic phenomenon, data indicating variations of various principal economic indices and data indicating a pattern of variations of an objective economic phenomenon to be predicted are input to the input layer neurons. The various principal economic indices include the objective economic phenomena to be predicted. The neural network is provided in advance with learning by data indicating trends of various principal economic indices obtained in the past and a pattern of variations of the objective economic phenomenon to be predicted as well as information concerning the objective economic phenomenon corresponding to these data. Therefore the output of the output layer neurons is the result of prediction based on both the trends of various principal economic indices and the pattern of variations of the objective economic phenomenon to be predicted.

Further, it is possible to perform a principal analysis based on the structure of the hidden layers (i.e., the weights of synaptic combinations with the output layer neurons). Thus the causal relationship between the past variation pattern and future variations of the objective economic phenomenon and the causal relationship between the input data to the neural network and its output data can be noticed by the principal analysis. This is true because the input information to the input layer neurons includes information indicating variations of various principal economic indices, i.e. differential information. Also, since the input information to the input layer neurons includes data indicating a pattern of variation of the objective economic phenomenon to be predicted, a so-called technical analytical explanation can be achieved.

According to a third aspect of the invention, there is provided an economic phenomenon predicting system comprising:

(a) a predicting neural network including (a1) an input layer having a plurality of input layer neurons for inputting signals indicating respective economic phenomena, (a2) a predetermined number of hidden layers having a plurality of hidden layer neurons, respectively, each of the input neurons being adapted to make synaptic combinations with arbitrary ones of the hidden layer neurons, and (a3) an output layer having a predetermined number of output layer neurons, each of the hidden layer neurons being adapted to make synaptic combinations with arbitrary ones of the output layer neurons, each of the output layer neurons being adapted to output a signal, (a4) wherein weights of the synaptic combinations between the input layer neurons and hidden layer neurons and weights of the synaptic combinations between the hidden layer neurons and the output layer neurons are organized by learning in such a manner that when data indicating trends of various principal economic phenomena including an economic phenomenon to be predicted and data indicating a variation pattern of the economic phenomenon to be predected are input to the input layer neurons, the signals output from the output layer neurons represent a result of prediction of the economic phenomenon;

(b) moving-average-value arithmetic means for inputting time series data indicating various principal economic indices and for obtaining moving-average values for a plurality of recent predetermined periods, the moving-average-value arithmetic means being adapted to supply the obtained moving-average values, as part of the data indicating the trends of the various principal economic indices including the economic phenomena, to the input layer neurons;

(c) difference arithmetic means for obtaining differences between the moving-average values, which are obtained in the individual common period, for at least from the first to the n-th order differences, the difference arithmetic means being adapted to supply the obtained differences, as part of the data indicating the trends of the various principal economic indices including the economic phenomenon to be predicted;

(d) trend removing means for removing trends from time series data indicating the economic phenomenon to be predicted by subtracting from the time series data the individual moving-average value of the economic phenomenon for any of the predetermined periods; and (e) pattern-sorting means for sorting the time series data indicating the economic phenomenon to be predicted after removing the trends into patterns, the pattern-sorting means being adapted to output the patterns, which are obtained from the sorting, as data indicating a variation pattern of the economic phenomenon to be predicted to the input layer neurons.

In the system having this construction, firstly the time series data indicating various principal economic indices (including the objective economic phenomenon to be predicted) is input to the moving-average-value arithmetic means. The objective economic phenomenon is a stock index, e.g. TOPIX, indicating prices of stocks which may be sold or bought. Various principal economic indices other than the objective economic phenomenon are turnover, various interest rates, principal merchandise prices, financial indices, trade indices, price indices, etc. The moving-average-value arithmetic means obtains moving averages of the input time series data in most recent predetermined numbers of periods and performs a moving average arithmetic using the weights set so that the sum is 1, for example. Also the moving-average-value arithmetic means supplies the obtained moving averages to the input layer neurons.

Further, the difference arithmetic means obtains at least first to n-th order differences of the values obtained in the same period, out of the moving averages. The different arithmetic means supplies the obtained differences to the input layer neurons. Although n may be 1 or more, a second order is preferable.

The moving averages thus obtained and their differences are data indicating trends of various principal economic indices. Namely, these data are information usable for fundamental analysis. To the input layer neurons, these fundamental analysis data as well as information usable for technical analysis are input.

In this arrangement, the technical analysis data to be input to the input layer neurons can be obtained by the pattern sorting means. The pattern sorting means sorts the time series data, which is obtained by the trend removing means, into patterns. The trend removing means subtracts from the time series data, indicating the objective economic phenomenon, the values of any period out of the moving averages obtained as mentioned above. The thus obtained data are time series data indicating the objective economic phenomenon and free of trends. Thus the patterns obtained by this sorting will become data indicating patterns of variations of the objective economic phenomenon.

The pattern sorting means itself may be a neural network provided with learning by patterns that have frequently appeared in the past, so as to output the data indicating a corresponding pattern in responding to the input of the trend-free time series data. Practical topology may be a self-organizing map.

When the data indicating trends of various principal economic indices including the objective economic phenomenon and also the data indicating the pattern of variation of the objective economic phenomenon are input, the result of prediction of the objective economic phenomenon can be obtained, as signals, from the respective output layer neurons. This is true because the neural network is provided with the above-mentioned learning process. More specifically, this is because the weights of synaptic combinations of the input layer and hidden layer neurons and the weights of synaptic combinations of the hidden layer and output layer neurons are organized by learning so as to obtain an expected result of prediction when the data indicating variations of various principal economic indices and the data indicating the pattern of variation of the objective economic phenomenon are input to the input layer neurons.

According to a fourth aspect of the invention, there is provided an economic phenomenon predicting and analyzing system comprising:

(a) a neural network for predicting economic phenomena, including (a1) an input layer having a plurality of input layer neurons for inputting signals indicating respective economic phenomena, (a2) a predetermined number of hidden layers having a plurality of hidden layer neurons, respectively, each of said input neurons being adapted to make synaptic combinations with arbitrary ones of the hidden layer neurons, and (a3) an output layer having a predetermined number of output layer neurons, each of the hidden layer neurons being adapted to make synaptic combinations with arbitrary ones of the output layer neurons, each of said output layer neurons being adapted to output a signal, and (a4) wherein weights of the synaptic combinations between said input layer neurons and hidden layer neurons and weights of the synaptic combinations between the hidden layer neurons and the output layer neurons are organized by learning in such a manner that when data indicating variations of various principal economic phenomena including an economic phenomenon to be predicted and data indicating a variation pattern of the economic phenomenon to be predicted are input to the input layer neurons, the signals output from the output layer neurons represent a result of prediction of the economic phenomenon;

(b) moving-average-value arithmetic means for inputting time series data indicating various principal economic indices and for obtaining moving-average values for a plurality of recent predetermined periods, the moving-average-value arithmetic means being adapted to supply the obtained moving-average values, as part of the data indicating the variations of the various principal economic indices including the economic phenomenon to be predicted, to the input layer neurons;

(c) difference arithmetic means for obtaining differences between the moving-average values, which are obtained in the individual common period, for at least from the first to the n-th order differences, the difference arithmetic means being adapted to supply the obtained differences, as part of the data indicating the variations of the various principal economic indices including the economic phenomena to be predicted;

(d) principal component arithmetic means for obtaining principal components of the output of the hidden layer neurons by principal analysis; and (e) correlation analyzing means for analyzing a correlation between variation of the economic phenomenon to be predicted and variation of the output of the output layer neurons by analyzing the obtained principal components.

In this system, like the foregoing system, the moving averages of time series data indicating various principal economic indices and their differences are obtained. These are input to the input layer neurons as data indicating variations of various principal economic indices including the objective economic phenomenon. In response to this input, the neural network outputs the result of prediction of the objective economic phenomenon as signals. This is because, as described above, the weights of synaptic combinations of the input layer and hidden layer neurons and the weights of synaptic combinations of the hidden layer and output layer neurons are organized, by learning, in such a manner that when the data indicating variations of various principal economic indices and the data indicating a pattern of variation of the objective economic phenomenon are input to the input layer neurons, the output signals of the output layer neurons will be the result of prediction of the objective economic phenomenon.

Further, it is possible to perform a principal analysis based on information concerning of the output of the hidden layer neurons. The principal component arithmetic means obtains principal components by performing a principal analysis for the output of the hidden layer neurons. The term "principal component" means a small number of variants when expressing a large number of variants using only a small number of variants. Intuitively, the large number of variants should be regarded as vectors, and the small number of variants should be regarded as unit vectors. Accordingly the large number of variants can be grasped as a linear combination of unit vectors. In other words, this unit vector (direction) can be regarded as the principal component. Generally, if there is any correlation between the large number of vectors, it is possible to approximate the vector indicating the large number of variants by linear combinations of fewer variants (principal components). The principal component arithmetic means obtains principal components by, for example, making an arithmetic of the elgen vectors of covariance matrix of the outputs of the hidden layer neurons according to the Jacobi method.

The correlation analyzing means analyzes the correlation between variations of the objective economic phenomenon and variations of output of the output layer neurons by analyzing the obtained principal components. For example, the correlation analyzing means inputs the inputs of neural network as the outputs of the hidden layer neurons and calculates explanation variant based on these outputs. The term "explanation variant" are variants to be factors of the objective economic phenomenon. The explanation variants may be exemplified by the inputs of the neural network for prediction, the difference between moving averages of different periods for the time series data indicating the same principal economic indices, and the difference between moving averages of the same period for the time series data indicating different principal economic indices. The explanation variants can be obtained by, for example, the principal component arithmetic means. In this case, the principal component arithmetic means inputs the inputs of the neural network as the outputs of the hidden layer neurons and calculates each explanation variant based on these outputs.

After the principal components for every learning data have been obtained by the principal component arithmetic means, the correlation analyzing means obtains, with respect to the obtained principal components, a frequency distribution of the principal component rankings, then the strength of the correlation between the rankings and each explanation variant from the obtained frequency distribution, and then an effect of the rankings on the objective economic phenomenon from the obtained frequency distribution. At that time, the strength of the correlation between the ranking and each explanation variant may be obtained in the following manner. Firstly, from the obtained frequency distribution, a first section including only the maximum value, a second section to which an upper predetermined proportion of learning data except the maximum value belongs, a third section to which a lower predetermined proportion of learning data except the minimum value belongs and a fourth section including only the minimum value are obtained, and then an average of explanation variants and a standard deviation in each of the second and third sections are obtained. Alternatively, for the explanation variant in which the difference between the average of the second section and that of the third section is relatively large and in which the proportion of the standard deviation to an absolute value of the difference is small, the correlation of the explanation variant with respect to the rankings is then regarded as being relatively strong. Further, for obtaining an effect of the ranking on the objective economic phenomenon, firstly, from the obtained frequency distribution, a first section including only the maximum value, a second section to which an upper predetermined proportion of learning data except the maximum value belongs, a third section to which a lower predetermined proportion of learning data except the minimum value belongs and a fourth section including only the minimum value are obtained, and then the rankings are weighted by the weights of synaptic combinations of the individual hidden layer and output layer neurons, the weighted rankings are summed in respective sections, and, whereupon the result of these weighted summations are multiplied by the range of the corresponding section and summed.

According to this system, it is possible to relax the restriction of the number of hidden layer neurons to meet requirements for the analysis system. Namely, since the number of hidden layer neurons is not limited by the number of clusters, etc., many hidden layer neurons can be used. This can be realized using a single neural network; in other words, it can be realized using the neural network for prediction also as a neural network for analysis. Further, since sorting in clusters does not take place, it is possible to determine the number of hidden layer neurons without using a trial-and-error experimental method.

Furthermore, since moving averages are used for inputs to the neural network, it is possible to perform an analysis using information concerning the crossing point of folded lines of the moving average which is useful in the monetary field.

When the number of hidden layers is set to one and the number of output layer neurons is set to one, the result of analysis will be simple. For example, the causal relationship between the rankings and the variation of indices of the objective economic phenomenon will be simple. Also, this system may be equipped with a postprocess means for converting the output data from the output layer neurons of the neural network into a rate of change of the indices of the objective economic phenomenon to be predicted.

According to a fifth aspect of the invention, there is provided an economic phenomenon predicting method comprising the steps of:

(a) inputting time series data indicating various principal economic indices and obtaining moving-average values for a plurality of recent predetermined periods, the various principal economic indices including an economic phenomenon to be predicted;

(b) obtaining differences between the moving-average values, which are obtained in the individual common period, for at least from the first to the n-th order differences;

(c) removing a trend from time series data indicating the economic phenomenon to be predicted by inputting the time series data indicating the economic phenomenon to be predicted and by subtracting from the time series data the individual moving-average value of the economic phenomenon for any of the predetermined periods;

(d) sorting the time series data indicating the economic phenomenon to be predicted after step (c) into patterns; and (e) predicting the economic phenomenon, based on the moving-average values, the hierarchical differences and the patterns obtained by sorting, using a neural network including (e1) an input layer having a plurality of input layer neurons for inputting the moving-average values and hierarchical differences as data indicating the trends of various principal economic indices including the economic phenomenon to be predicted and inputting the pattern obtained by sorting as data indicating a variation pattern of the economic phenomenon to be predicted, the pattern obtained by said sorting, (e2) a predetermined number of hidden layers having a plurality of hidden layer neurons, respectively, each of the input neurons being adapted to make synaptic combinations with arbitrary ones of the hidden layer neurons, and (e3) an output layer having a predetermined number of output layer neurons, each of the hidden layer neurons being adapted to make synaptic combinations with arbitrary ones of the output layer neurons, each of the output layer neurons being adapted to output a signal representing the result of prediction of the economic phenomenon, and (e4) wherein weights of the synaptic combinations between input layer neurons and hidden layer neurons and weights of the synaptic combinations between the hidden layer neurons and the output layer neurons are organized by learning in such a manner that when the data indicating the trends of the various principal economic indices and the data indicating the variation pattern of the economic phenomenon to be predicted are input to the input layer neurons, the signals output from the output layer neurons represent the result of prediction of the economic phenomenon.

According to a sixth aspect of the invention, there is provided an economic phenomenon predicting and analyzing method comprising the steps of:

(a) inputting time series data indicating various principal economic indices and obtaining moving-average values for a plurality of recent predetermined periods, each of the various principal economic indices including an economic phenomenon to be predicted;

(b) obtaining differences between the moving-average values, which are obtained in the individual common period, for at least from the first to the n-th order differences;

(c) predicting the economic phenomenon, based on the moving-average values and hierarchical differences, using a neural network including (c1) an input layer having a plurality of input layer neurons for inputting the moving-average values and differences as data indicating the trends of various principal economic indices including the economic phenomenon to be predicted, (c2) a predetermined number of hidden layers having a plurality of hidden layer neurons, respectively, the input neurons being adapted to make synaptic combinations with arbitrary ones of the hidden layer neurons, and (c3) an output layer having a predetermined number of output layer neurons, each of the hidden layer neurons being adapted to make synaptic combinations with arbitrary ones of the output layer neurons, each of the output layer neurons being adapted to output a signal representing the result of prediction of the economic phenomenon, and (c4) wherein weights of the synaptic combinations between the input layer neurons and hidden layer neurons and weights of the synaptic combinations between the hidden layer neurons and the output layer neurons are organized by learning in such a manner that when the data indicating the variations of the various principal economic indices and the data indicating the variation pattern of the economic phenomenon to be predicted are input to the input layer neurons, the signals output from the output layer neurons represent the result of prediction of the economic phenomenon to be predicted;

(d) obtaining principal components by a principal analysis for the outputs of the hidden layer neurons; and (e) analyzing the correlation between the variation of economic phenomenon to be predicted and the variations of outputs of the output layer neurons by analyzing the obtained principal components.

According to a seventh aspect of the invention, there is provided an economic phenomenon predicting system comprising:

(a) a network organized so as to output a result of prediction of an economic phenomenon when data indicating variations of various principal economic indices including the economic phenomenon to be predicted and data indicating a variation pattern of the economic phenomenon to be predicted are input;

(b) moving-average-value arithmetic means for inputting time series data indicating various principal economic indices and for obtaining moving-average values for a plurality of recent predetermined periods, the moving-average-value arithmetic means being adapted to supply said obtained moving-average values, as part of the data indicating the variations of the various principal economic indices including the economic phenomenon to be predicted, to the network;

(c) difference arithmetic means for obtaining differences between the moving-average values, which are obtained in the individual common period, for at least from the first to the n-th order differences, the difference arithmetic means being adapted to supply the obtained differences, as part of the data indicating the trends of said various principal economic indices including the economic phenomena to be predicted, to the network;

(d) trend removing means for removing trends from time series data indicating the economic phenomenon to be predicted by subtracting from the time series data the individual moving-average value of the economic phenomenon for any of the predetermined periods; and (e) pattern-sorting means for sorting the time series data indicating the economic phenomenon to be predicted into patterns, the pattern-sorting means being adapted to input the patterns, which are obtained from the sorting, as data indicating a variation pattern of the economic phenomenon to be predicted to the network.

According to an eighth aspect of the invention, there is provided an economic phenomenon predicting and analyzing system comprising:

(a) a neural network organized so as to generate a number of hidden layer outputs according to both data indicating variations of various principal indices including an economic phenomenon to be predicted and data indicating a variation pattern of the economic phenomenon to be predicted and so as to output signals indicating a result of prediction of the economic phenomenon by combining the hidden layer outputs;

(b) moving-average-value arithmetic means for inputting time series data indicating various principal economic indices and for obtaining moving-average values for a plurality of recent predetermined periods, the moving-average-value arithmetic means being adapted to supply the obtained moving-average values, as part of the data indicating the trends of the various principal economic indices including the economic phenomena to be predicted, to the network;

(c) difference arithmetic means for obtaining a differences between the moving-average values, which are obtained in the individual common period, for at least from the first to the n-th order differences, the difference arithmetic means being adapted to supply the obtained differences, as part of the data indicating the variations of the various principal economic indices including the economic phenomenon to be predicted, to the network;

(d) principal component arithmetic means for obtaining principal components of the hidden layer outputs; and (e) correlation analyzing means for analyzing a correlation between variation of the economic phenomenon to be predicted and variation of the output of the network by analyzing the obtained principal components.

DETAILED DESCRIPTION

Preferred embodiments of this invention will now be described with reference to the accompanying drawings.

Figure 1:
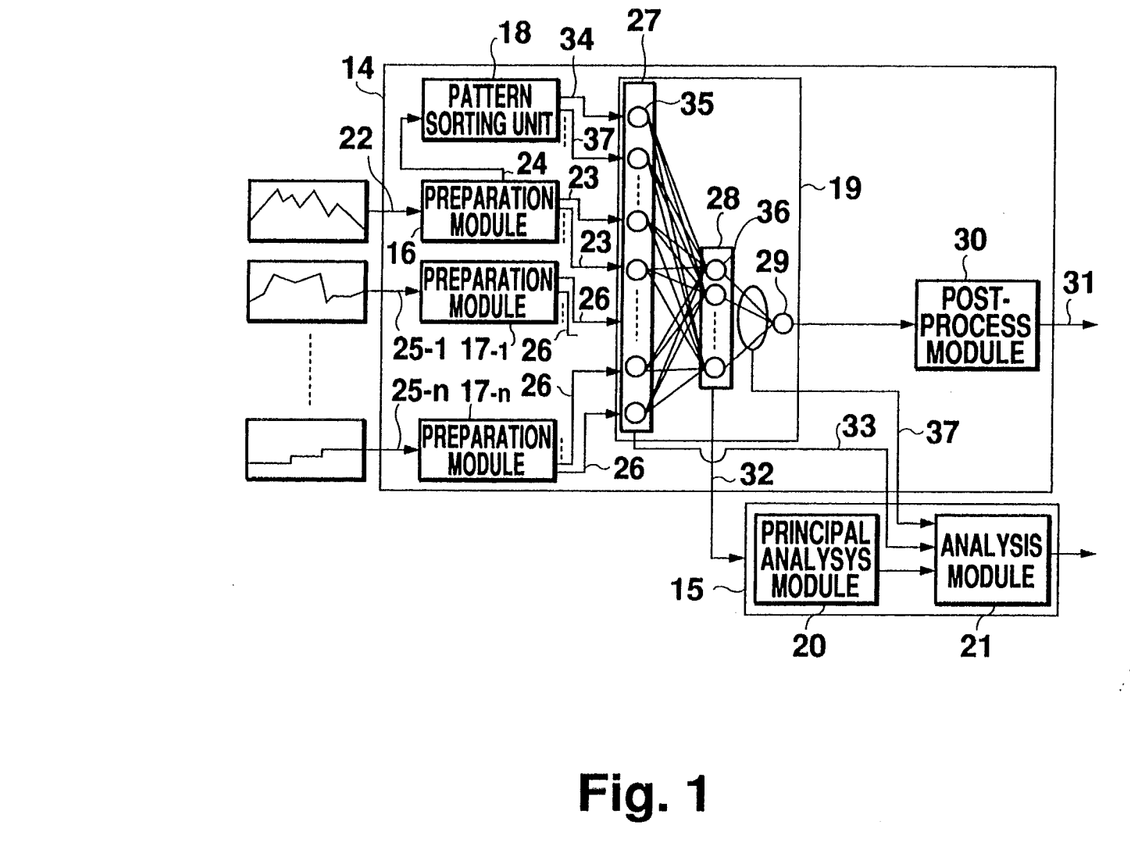
FIG. 1 is a diagram showing an economic phenomenon predicting and analyzing system, using neural networks, according to one embodiment of this invention.

FIG. 1 shows an economic phenomenon predicting and analyzing system according to one embodiment of the invention. This system predicts and analyzes variations in TOPIX. This invention can be applied also to prediction and analysis of economic time series data other than TOPIX as any person skilled in the art may make such applications based on the following disclosure. The system of FIG. 1 comprises a prediction system 14 and an analysis system 15 as subsystems.

The prediction system 14 includes a preparation module 16, a plurality of preparation modules 17, a pattern sorting unit 18, and a predicting neural network 19. The analysis system 15 includes a principal analysis module 20 and a correlation analysis module 21.

The preparation module 16 inputs time series data 22 in TOPIX, which are to be predicted, and performs preprocessing over the input data. As a result, various differences 23 containing difference information of time series data 22, and a variation pattern 24, from which trends have been removed, are obtained. Upon inputting time series data 22, the preparation module 16 supplies various differences 23 and the trend-free variation pattern 24 to the neural network 19 and the pattern sorting unit 18, respectively.

At the same time, each preparation module 17 inputs time series data 25-1 to 25-n of principal economic indices described below and performs a preprocess. As a result, various differences 26 containing difference information of these principal economic indices are obtained. Each preparation module 17 supplied various differences 26 to the neural network 19.

Specifically, the preparation module 16 obtains a moving average of time series data 22 over the recent month, a moving average of time series data 22 in the recent three months, and a moving average of time series data 22 in the recent six months. The moving average is a value which is obtained by defining a time point in the past as the origin and assigning variations of time series data after this time point in an estimate equation and which shows the drift of variations in time series data from the origin to this time point. In the illustrated example, when making arithmetic operations for these three kinds of moving averages, the origins for the three values are determined for one month ago, three months ago and six months ago, respectively. In the illustrated example, the estimate equation is a weighted overage arithmetic equation. Further, the time series data to be assigned in this estimate equation is time series data 22 in the case of the preparation module 16.

In the data composing the time series data 22, assume that the data at the time t is represented by $x_0(t)$ and the weights, by which the data at the time $t-i$ is to be multiplied, is represented by $\phi_{0i}$. If the moving average is for one month, it is represented by a subscript $N=1$; if the moving average is for three months, it is a subscript $N=2$; and if the moving average is for six months, it is represented by $N=3$. Accordingly the moving average $a_{0N}(t)$ of TOPIX at the time t is given by the following equation (3):

$$a_{0N}(t) = \sum_{i=0}^{N-1} \phi_{0i} x_0(t-i) \tag{3}$$

The weighting $\phi_{0i}$ is determined based on the following equations (4) and (5):

$$\phi_{0i} = \phi_0 i / \sum_{k=0}^{N-1} \phi_{0k} \tag{4}$$

$$\phi_{0N-1} = 0.1 \tag{5}$$

Thus the weights $\phi_{0i}$ are normalized in such a manner that their sum will be 1.

After obtaining the three kinds of moving averages $a_{01}(t)$, $a_{03}(t)$ and $a_{06}(t)$ using the equation (3), the preparation module 16 obtains final values $X_0^0{}_N(t)$, first order difference $X_0^1{}_N(t)$, and second order differences $X_0^2{}_N(t)$ ($N=1, 3, 6$) using the following equations (6) to (8). The preparation module 16 supplies these values, as various differences 23, to the neural network 19.

$$X_0^0{}_N(t) = a_{0N}(t) \tag{6}$$

$$X_0^1{}_N(t) = a_{0N}(t) - a_{0N}(t-1) \tag{7}$$

$$X_0^2{}_N(t) = a_{0N}(t) - 2a_{0N}(t-1) + a_{0N}(t-2) \tag{8}$$

Meanwhile, the individual preparation modules 17 input the respective time series data 25-1 to 25-n. The time series data 25-1 to 25-n to be input are, for example, turnovers, a longest-period interest of national bonds, a three-month official interest, expenditures of private final consumption, received orders of building construction, a Dubai crude oil price, a yen-dollar rate, price indices of nationwide urban districts, current profits, a real wage index, an average balance of money supply, a shipping index of mining and manufacturing industries, a trade balance, a Yew York Dow-Jones average, a wholesale price index, etc.

The preparation modules 17 have the same function as the preparation module 16; they perform a moving average process and a difference arithmetic process based on the input time series data 25-1 to 25-n. The preparation modules 17 output such processed data to the neural network 19.

The processes to be executed by the preparation modules 17 have the same formats as the above-mentioned equations (3) to (8) except that the data to be processed are time series data 25-1 to 25-n rather than time series data 22. Namely the preparation modules 17 can represent each subscript 0 in the equations (3) to (8) by j ($j=1, 2, ..., n$) indicating any of the time series data 25-1 to 25-n.

More specifically, the preparation modules 17 obtain final values $X_j^0{}_N(t)$, first order differences $X_j^1{}_N(t)$ and second order differences $X_j^2{}_N(t)$ ($N=1, 3, 6$) for the data to be processed by themselves, i.e. the respective time series data 25-1 to 25-n, by performing processes expressed by the following equations (3') to (8'):

$$a_{jN}(t) = \sum_{i=0}^{N-1} \Phi_{ji} x_0(t-i) \quad (3')$$

$$\Phi_{ji} = \Phi_j{}^i / \sum_{k=0}^{N-1} \Phi_j{}^k \quad (4')$$

$$\Phi_j^{N-1} = 0.1 \quad (5')$$

$$X_{j0N}(t) = a_{jN}(t) \quad (6')$$

$$X_{j1N}(t) = a_{jN}(t) - a_{jN}(t-1) \quad (7')$$

$$X_{j2N}(t) = a_{jN}(t) - 2a_{jN}(t-1) + a_{jN}(t-2) \quad (8')$$

Each preparation module 17 supplies various kinds of differences 26, i.e. the final values $X_j{}^0{}_N(t)$, first order differences $X_j{}^1{}_N(t)$ and second order differences $X_j{}^2{}_N(t)$ (N=1, 3, 6), to the neural network 19.

Thus the information to be supplied to the neural network 19 can be used as a so-called fundamental 22 analysis index. As described above, the time series data to be processed by the preparation module 16 is data concerning TOPIX, i.e. kinds of principal economic indices. Likewise the time series data 25-1 to 25-n to be processed by the respective preparation modules 17 are also turnovers and other principal economic indices. In the illustrated embodiment, the difference information of these indices are obtained in the following forms to be input to the neural network 19: the final values $X_o{}^0{}_N(t)$, first order differences $X_o{}^1{}_N(t)$ and second order differences $X_o{}^2{}_N(t)$; or final values $X_j{}^0{}_N(t)$, first order differences $X_j{}^1{}_N(t)$ and second order differences $X_j{}^2{}_N(t)$.

The first order differences $X_o{}^1{}_N(t)$ and $X_j{}^1{}_N(t)$ represent rates of increase or decrease of the corresponding variants (time series data 22 or 25-1 to 25-n) and the second order differences $X_o{}^2{}_N(t)$ and $X_j{}^2{}_N(t)$ represent a changes of the increasing or decreasing rates of corresponding variants. Therefore, in this embodiment, the data as various differences 23 to be supplied to the neural network 19 are usable as fundamental analysis indices that indicate economic realities, ex. Japan, United States, surrounding the stock market, which are data to be expressed in a difference form. Although arithmetic operations are performed up to the second differences in this embodiment, this invention should by no means be limited to any order of arithmetic operation of differences. Practically, up to second order differences to be grasped intuitively is enough.

The preparation modules 16 obtains data to be supplied to the pattern sorting unit 18, i.e. a variation pattern 24 after trends have been removed from the time series data 22.

The preparation module 16 firstly subtracts a six-month-range moving average $a_o{}^0{}_3(t)$, i.e. a final value $X_o{}^0{}_3(T)$, from the data $x_o(t)$ at the time t, which constitutes the time series data 22, to remove trends. That is, the data $p_{01}(t)$ free of trends is obtained by carrying out an arithmetic operation based on the following equation (9):

$$p_{01}(t) = x_o(t) - X_o{}^0{}_6(t) \quad (9)$$

The preparation module 16 normalizes $p_{01}(t)$ in the past eight months. That is, assume that if a subscript i of $p_{01}(t)$ represents data on the i-th month, the preparation module 16 obtains the i-th month pattern $p_{01}(t)$ free of trends by performing an arithmetic operation based on the following equation (10):

$$P_{0i}(t) = p_{0i}(t) / \left[ \sum_{i=1}^{8} \{p_{0i}(t)\}^2 \right]^{\frac{1}{2}} \quad (10)$$

The pattern sorting unit 18 is realized by a neural network called "a self-organizing map". This neural work is provided in advance with learning of all learning data to determine synaptic combination weights between the individual neurons constituting the neural network. The algorithm implementing the self-organizing map is discussed in, for example, "The Self-Organizing Map", by Teuvo Kohonen, in Proceedings of the IEEE, Vol. 78, No. 9, Sept. 1990. In the system of this embodiment, the topology in which 16 neurons are arranged in a pattern of a 4×4 mesh is used, and the following equation is used for the learning factor $\alpha(t)$:

$$\alpha(i) = 0.5/(1+(i-1)*0.1) \quad (11)$$

where i stands for a number of learning cycles and the initial value of i is 1. i increases by 1 every time all learning data is exhibited with respect to the self-organizing map. For application to this embodiment, it is preferable to repeatedly exhibit all learning data about 10,000 times with respect to the self-organizing map, i.e. until i=10,000. The outputs of sixteen neurons constituting the self-organizing map are output from the pattern sorting unit 18 to the neural network 19.

Therefore, since the learning of the pattern sorting unit 18 is performed according to variations in the time series data 22 concerning TOPIX, i.e. $P_{01}(t)$ which is information obtained based on a price variation of TOPIX, the output of the pattern sorting unit 18 in actual use is information indicating an optimum pattern to simulate actual price variations of TOPIX selected from patterns that have appeared frequently in the past. This information can be used as indices for technical analysis.

Thus, one feature of this embodiment is that the indices for fundamental analysis and the indices for technical analysis are input to the neural network 14.

The neural network 19 comprises an input layer 27, a hidden layer 28 and an output layer. Either the input layer 27 or the hidden layer 28 is composed of a predetermined number of neurons 35, 36. The output layer of the neural network 19 includes a single output neuron 29. The neural network 19 is a hierarchical neural network.

In this invention, however, the number of either the output neurons 29 or hidden layers 28 should by no means be limited to one. Each input layer neuron 35 receives any of the output 23 of the preparation module 16, the outputs 26 of the preparation modules 17-1–17-n and the output 34 of the pattern sorting unit 18. Each of the outputs of these input layer neurons 35 is combined with the input of the respective hidden layer neurons 36 in synaptic combination form. Weights of these combinations are organized when learning is performed. Furthermore, the outputs of the hidden layer neurons 36 are combined with the input of the output neuron 29. The synaptic combination weights concerning these combinations are self-organized during learning.

The learning of the neural network 19 takes place using learning data obtained in past time points. These learning data are the data used for predictions of TOPIX and thus-obtained TOPIX data at past time points.

Input signals out of this learning data are signals obtained by inputting the economic time series data 22, 25-1-25-n, which are obtained at a month previous to the month which is the objective month of prediction, to the preparation modules 16, 17-1-17-n and the pattern sorting unit 18. Specifically, the user supplies the economic time series data 22 of the previous month to the preparation module 16 to cause the preparation module 16 and the pattern sorting unit 18 to perform the above-mentioned process so that various differences 23 of moving averages of TOPIX and a pattern of trend-free variation are obtained. The pattern sorting unit 18 to be a neural network itself sorts the thus obtained trend-free pattern of variation as it is to be any of patterns that have frequently appeared in the past. Then the pattern sorting unit 18 outputs the result of sorting. The individual preparation modules 17-1 to 17-n inputs the respective time series data 25-1 to 25-n of principal economic indices and output various differences 26 of their moving average. The individual input layer neurons 35 input these data, i.e. various differences 23 of moving average of TOPIX, various differences 26 of moving average of other principal indices and the pattern of TOPIX variation which is the output 34 of the pattern sorting unit 18.

Teaching data out of the learning data of the neural network 19 may be the data that is obtained from TOPIX values for the previous month t and the objective month t+1 in the following manner:

$$ln(X_o(t+1)/X_o(t))/2.0 \quad (12)$$

The learning algorithm of the neural network 19 is exemplified by "Learning Internal Representation by Error Propagation", by D. E. Runmelhart, G. E. Hinton and R. J. Williams, in Parallel Distributed Processing, The MIT Press (1986). Preferably, the learning factor is 0.1 and the factor of inertial term is 0.9.

By performing this learning process, the neural network 19 is self-organized so as to output a TOPIX value for the objective month, in response to the input of information for fundamental analysis and technical analysis. Specifically, when the fundamental analysis indices obtained as the outputs 23, 26 of the preparation modules 16, 17-1 to 17-n and the technical analysis indices obtained as the outputs 34, 37 from the pattern sorting unit 18 are input to the neural network 19 at real use, the neural network 19 outputs $ln(X_o(t+1)/X_o(t))/2.0$, where t represents the month of real use rather than the previous month of learning.

The post-process module 30 converts $ln(X_o(t+1)/X_o(t)/2.0$ into a rate of change:

$$(X_o(t+1)-X_o(t))/X_o(t) \quad (13)$$

Namely, assuming that the input of the post process module 30 is x and the output 31 thereof is y, the post-process module 30 performs the following arithmetic:

$$y=e^{2x}-1 \quad (14)$$

The analysis system 15, as described above, is composed of the principal analysis module 20 and the correlation analysis module 21.

The principal analysis module 20 performs a principal analysis of the outputs 32 of the hidden layer 28. The term "principal analysis" is used in the field of multivariate analysis. This analysis is used for finding a small number of variants (principal components) explaining the change of a large number of variants. Intuitively, each really existing variant is not treated individually and is regarded as a linear combination of the unit vectors. Each of the unit vectors indicates a variant which explains the change of these really existing variants. Each of the principal components can be intuitively grasped as each of these unit vectors.

The principal components include a first, a second, a third, ..., etc.. The first principal component means the direction in which variance of variant vectors is greatest, where the variant vectors are the really existing variants. The second principal component means the direction which is perpendicular to the first principal component and in which variance of the variant vectors is second greatest to the first principal component. The third principal component means the direction which is perpendicular to the second principal component and in which variance of the variant vectors second greatest to the second principal component. Thus the individual principal components are directions defined successively.

When the neural network 19 is learning, the principal analysis module 20 inputs the output values 32 of all neurons 36 of the hidden layer 28 for every learning data. The principal analysis module 20 then obtains principal components, based on the outputs 32 of the neurons 36 of the hidden layer 28, in the following manner:

Firstly, the outputs 32 of the neurons 36 of the hidden layer 28 are represented by $h_{ik}$, where i=1, 2, M, and k=1, 2, ..., K. M is the number of neurons 36 of the hidden layer 28, and K is the number of learning data. Accordingly the component $s_{ij}$ of $(s_{ij})$, which is the covariance matrix of $h_{ik}$, can be expressed by the following equation (15):

$$S_{ij}=(h_{ik}-h_{im})X(h_{jk}-h_{jm}) \quad (15)$$

where $h_{im}$ represents an average of $h_{ik}$ for i (i=1, 2, ..., K). The principal components can be obtained as eigen vectors of the covariance matrix $(s_{ij})$. The principal analysis module 20 obtains the eigen vectors of the covariance matrix by the Jacobi method.

The correlation analysis module 21 obtains a correlation between the explanation variants calculated from the inputs 33 to the network 19 with the medium of the outputs 32 of the hidden layer 28 of the neural network 19 and the output of the neural network 19.

The term "explanation variant" means a variant on which an objective variant depends when explaining the objective variant and its change. Thus the explanation variant is treated as having a causal relationship with the objective variant. In this embodiment, the objective variant is economic data to be predicted, i.e. time series data 22 of TOPIX and its change, and the explanation variants are a) the inputs 33, b) the differences of moving averages of different periods (i.e., moving averages of different N) output of moving averages obtained for the same economic time series data (any of 22, 25-1 to 25-n), c) the differences of moving averages of the same period out of the moving average obtained for different kinds of economic time series data.

The moving average curve is a can be represented as a folded line indicating the moving averages with respect to time t in x coordinate. For example, assuming that the folded line of the moving average of a short period (e.g. one month) climbs over the folded line of the moving average of a long period (e.g. six months) in the situation where the long-period moving average turns no marked variations or upwards tendencies from a decreasing tendency, the technical analysis grasps it as the time to buy. The second one of the foregoing explanation variants is a variant which enables this analysis. Assuming that the amount of imports is greater than the amount of exports over a somewhat long period, a change will appear in the economic situation and hence an effect will appear on stock prices over a long period. The third one of the foregoing explanation variants is a variant explaining such an effect. These explanation variants are variants effective for explaining variations in TOPIX in market prediction.

The correlation analysis module 21 obtains a distribution of frequency of ranking of principal components for all learning data based on the principal components calculated by the principal analysis module 20 and also obtains a) a maximum value, b) a minimum value, c) a section including a lower 10% number of learning data except the minimum value, and d) a section including an upper 10% number of data except the maximum value. Assuming that the vector composed of vectors of the average of various variants is the origin vector, the rankings of principal component are represented as is projections in the direction of principal component of the variate vector.

The analysis module 21 then considers the group of learning data contained in the lower 10% of data for the principal components and the group of data contained in the upper 10% of the same, and obtains average values and standard deviations of explanation variants in the respective groups. The difference in average value between the upper 10% data and the lower 10% data is relatively large and the standard deviation with respect to an absolute value of this difference is relatively small, the correlation between the explanation variants and the principal component rankings will be regarded as relatively strong. On the other hand, the effect $E_i$ of the principal component rankings $P_1$ on the rate of change of the economic time series data to be predicted is obtained by the following equation:

$$E_i = \exp((\max_1 - \min_1)\Sigma P_{ij} W_j) - 1 \quad (16)$$

where $\min_1$, $\max_1$ are minimum and maximum values of the i-th principal component ranking, $P_{ij}$ is the j-th component of the i-th principal component, and $W_j$ is a synaptic combination weight 37 from the j-th neuron to the output neuron 29. This way of obtaining this correlation is based on the assumption that the relationship between the explanation variants and the principal component rankings are monotonic. Therefore, although it is not necessarily statistically correct, it is known that this method practically suffices in many cases. Further, it is guaranteed that the relation between the principal component rankings and the variations of economic time series data is monotonic since the output neuron is single and only a single hidden layer 28 is connected to the output neuron 29. The analysis module 21 outputs the result of this analysis.

In the prior art, as described above, since redundant neurons would be provided if the hidden layer contained many neurons, easy analysis could not be achieved. Whereas, in this invention, even if the hidden layer contains many neurons, it is possible to analyze a cause for variations in the economic time series data to be predicted. Consequently, in the conventional method, the neural network to be used for actual prediction and that to be used for analysis must be different from each other. Whereas in this invention, the same neural network can be used.

Further, in the prior art, since the individual economic time series data are simply logarithmically converted and normalized to be input to the neural network, it is possible to analyze only the relation between the largeness of these input values and the variations of the economic time series data to be predicted. Whereas, in the economic time series data analyzing system according to this invention, since the input data includes difference data indicating the variations of various economic time series data, it is possible to analyze the relationship between the variations(e.g., increase, decrease, maximum, minimum, etc.) of input economic time series data and the variations of objective economic time series data to be predicted.

Furthermore, since the input data includes the result of pattern sorting for the objective economic time series data, it is possible to obtain the causal relationship between this pattern and the objective economic time series data, namely, the technical analytical explanation.

Conventionally, in analysis of the monetary market, the point at which graphs of moving averages in different periods cross one another can mean something analytically significant on many occasions. On some other occasions, the relation in largeness between some kinds of economic time series data can mean something analytically significant. In this invention, since the difference between moving averages in different periods for the same economic time series data and also the difference between moving averages in the same period for different economic time series data are defined as explanation variants, it is possible to perform an analysis tempered with that information.

The pattern sorting unit 18 in the form of a self-organizing map and the neural network 19 may be implemented by either hard logic or software.

What is claimed is:

1. An economic phenomenon predicting system comprising:

(a) a predicting neural network comprising (a1) an input layer having a plurality of input layer neurons for inputting signals indicating respective economic phenomena, (a2) a predetermined number of hidden layers comprising a plurality of hidden layer neurons, respectively, each of said input neurons making synaptic combinations with arbitrary ones of said hidden layer neurons, each synaptic combination having a weight, and (a3) an output layer comprising a predetermined number of output layer neurons, each of said hidden layer neurons making synaptic combinations with arbitrary ones of said output layer neurons, each synaptic combination having a weight, and each of said output layer neurons outputting an output signal, and (a4) wherein the weights of the synaptic combinations between said input layer neurons and hidden layer neurons and the weights of the synaptic combinations between said hidden layer neurons and said output layer neurons are organized by learning so that when data indicating variations of various principal economic indices including an economic phenomenon to be predicted and data indicating a variation pattern of the economic phenomenon to be predicted are input to said input layer neurons, said signals output from said output layer neurons represent a result of prediction of the economic phenomena;

(b) moving-average-value arithmetic means for inputting time series data indicating various principal economic indices including the economic phenomenon to be predicted and for obtaining moving-average values for a plurality of recent predetermined periods, said moving-average-value arithmetic means supplying said obtained moving-average values, as part of said data indicating the variations of the various principal economic indices including the economic phenomenon to be predicted, to said input layer neurons;

(c) difference arithmetic means for obtaining difference at least a first to an n-th order between said moving-average values, said difference arithmetic means supplying the obtained differences, as part of said data indicating the variations of said various principal economic indices including the economic phenomenon to be predicted;

(d) trend removing means for removing trends from the time series data indicating the economic phenomenon to be predicted by subtracting from said time series data indicting the economic phenomenon to be predicted the individual moving-average value of the economic phenomenon to be predicted for any of the plurality of predetermined periods; and (e) pattern-sorting means for sorting said time series data indicating the economic phenomenon to be predicted after removing the trends into patterns, said pattern-sorting means outputting patterns, said patterns being obtained from the sorting, as data indicating a variation pattern of the economic phenomenon to be predicted to said input layer neurons.

2. An economic phenomenon predicting system to claim 1, wherein the number of said hidden layers is one.

3. An economic phenomenon predicting system according to claim 1, wherein the number of output layer neurons is one.

4. An economic phenomenon predicting system according to claim 1, wherein said moving-average-value arithmetic means performs a moving-average-value arithmetic operation that is weighted so that a sum of the moving average values is 1.

5. An economic phenomenon predicting system according to claim 1, wherein said hierarchical-difference arithmetic means operates second order differences of said moving-average values.

6. An economic phenomenon predicting system according to claim 1, wherein each of the output signals of said output layer neurons is a signal representing an index of the economic phenomenon to be predicted.

7. An economic phenomenon predicting system according to claim 1, wherein the economic phenomenon to be predicted is a stock index representing a price of stocks on the market.

8. An economic phenomenon predicting system according to claim 1, wherein said various principal economic indices other than the economic phenomenon to be predicted include any of a turnover, various interest rates, prices of staple commodities, a financial index, a trade index and a price index.

9. An economic phenomenon predicting system according to claim 1, wherein said pattern-sorting means is a neural network provided by learning pattern that have frequently occurred in past periods in such a manner that when the time series data indicating the economic phenomenon to be predicted are input, the neural network outputs corresponding patterns obtained by said sorting.

10. An economic phenomenon predicting system according to claim 9, wherein said pattern-sorting means is a self-organizing map.

11. An economic phenomenon predicting system according to claim 1, further comprising a post-process means for converting the output signals from said output layer neurons of said neural network into a rate of change of indices of the economic phenomenon to be predicted.

12. An economic phenomenon predicting and analyzing system comprising:

(a) a neural network for predicting economic phenomenon, comprising (a1) an input layer having a plurality of input layer neurons for inputting signals indicating respective economic phenomena, (a2) a predetermined number of hidden layers having respective hidden layer neurons, respectively, each of said input neurons making synaptic combinations with arbitrary ones of said hidden layer neurons, each synaptic combination having a weight, and (a3) an output layer having a predetermined number of output layer neurons, each of said hidden layer neurons making a synaptic combinations with arbitrary ones of said output layer neurons, each synaptic combination having a weight, and each of said output layer neurons providing an output signal, wherein the weights of the synoptic combinations between said input layer neurons and hidden layer neurons and the weights of the synoptic combinations between said hidden layer neurons and said output layer neurons are organized by learning so that when data indicating variations of various principal economic indices including an economic phenomenon to be predicted and data indicating a variation pattern of the economic phenomenon to be predicted are input to said input layer neurons, said signals output from said output layer neurons represent a result of prediction of the economic phenomenon;

(b) moving-average-value arithmetic means for inputting time series data indicating various principal economic indices and for obtaining moving-average values for a plurality of recent predetermined periods, said moving-average-value arithmetic means supplying said obtained moving-average values, as part of said data indicating the variations of the various principal economic indices including the economic phenomenon to be predicted, to said input layer neurons;

(c) difference arithmetic means for obtaining a first to an n-th order difference between said moving-average values, said difference arithmetic means outputting the obtained differences, as part of said data indicating the variations of said various principal economic indices including the economic phenomenon to be predicted;

(d) principal component arithmetic means for obtaining principal components of the output of said hidden layer neurons by principal analysis; and (e) correlation analyzing means for analyzing a correlation between variation of the economic phenomenon to be predicted and variation of the output of said output layer neurons by analyzing the obtained principal components.

13. An economic phenomenon predicting and analyzing system according to claim 12, wherein the number of said hidden layers is one.

14. An economic phenomenon predicting and analyzing system according to claim 12, wherein the number of output layer neurons is one.

15. An economic phenomenon predicting and analyzing system according to claim 12, wherein said moving-average-value arithmetic means performs a moving-average-value arithmetic operation using the weights determined so that a sum of said moving average values is 1.

16. An economic phenomenon predicting and analyzing system according to claim 12, wherein said hierarchical-difference arithmetic means operates a second order differences of said moving-average values.

17. An economic phenomenon predicting and analyzing system according to claim 12, wherein each of the output signals of said output layer neurons are signals representing an index of the economic phenomenon to be predicted.

18. An economic phenomenon predicting and analyzing system according to claim 12, wherein the economic phenomenon to be predicted is a stock index representing the price of stock on the market.

19. An economic phenomenon predicting and analyzing system according to claim 12, wherein said various principal economic indices other than the economic phenomenon to be predicted include a turnover, any kind of interest rates, prices of staple marchandize, a financial index, a trade index or a price index.

20. An economic phenomenon predicting and analyzing system according to claim 12, further comprising a post-process means for converting each of the output signals from said output layer neurons of said neural network into a rate of change of indices of the economic phenomenon to be predicted.

21. An economic phenomenon predicting and analyzing system according to claim 12, further comprising:
trend removing means for removing trends from inputting time series data indicating the economic phenomena to be predicted by subtracting from said time series data the individual moving-average value of the economic phenomenon to be predicted for any of the predetermined periods; and
pattern-sorting means for sorting said time series data indicating the economic phenomenon to be predicted after removing trends from patterns, said pattern-sorting means generating output patterns, said output patterns being obtained from the sorting, as data indicating a variation pattern of the economic phenomenon to be predicted to said input layer neurons.

22. An economic phenomenon predicting and analyzing system according to claim 21, wherein said pattern-sorting means is a neural network that has been trained with learning patterns that have frequently occurred in past periods so that when the time series data indicating the economic phenomenon to be predicted are input, the neural network generates output patterns corresponding to patterns obtained by the sorting.

23. An economic phenomenon predicting and analyzing system according to claim 12, wherein said pattern-sorting means is a self-organizing map.

24. An economic phenomenon predicting and analyzing system according to claim 22, wherein said principal component arithmetic means obtains principal components by operating eigen vectors of covariance matrix of the output of said hidden layer neurons.

25. An economic phenomenon predicting and analyzing system according to claim 24, wherein said principal component arithmetic means obtains the principal components, for the output of said hidden layer neurons when said learning data are input to said input layer neurons, by operating said eigen vectors according to a Jacobi method.

26. An economic phenomenon predicting and analyzing system according to claim 25, wherein said principal component arithmetic means inputs the inputs of said neural network in the form of outputs of said hidden layer neurons and calculates the individual explanation variants based on a plurality of last-named outputs, and
wherein said correlation analyzing means obtains a distribution of frequency of principal component rankings for said principal components obtained, for every learning data, by said principal component arithmetic means, obtains from said distribution of frequency a degree of correlation between said principal component rankings and the explanation variants, and obtains from said correlation an influence of said principal component rankings upon the economic phenomenon to be predicted.

27. An economic phenomenon predicting and analyzing system according to claim 26, wherein said correlation analyzing means obtains the degree of correlation between said principal component rankings and the explanation variants by:
obtaining from said distribution of frequency a first section including only a maximal value, a second section that includes a predetermined proportion of upper learning data except the maximal value, a third section that includes a predetermined proportion of lower learning data except a minimal value, and a fourth section including only the minimal value;
obtaining average values and standard deviations for the explanation variants in each of said second and third sections; and
judging the explanation variants, wherein a difference between the average values of said second and third sections is relatively large and wherein a ratio of a standard deviation to an absolute value of said difference is small, to indicate that the correlation to said principal component rankings is relatively strong.

28. An economic phenomenon predicting and analyzing system according to claim 26, wherein said correlation analyzing means obtains the influence of said principal component rankings upon the economic phenomenon to be predicted by:
obtaining from said distribution of frequency a first section including only a maximal value, a second section to which a predetermined proportion of upper learning data except the maximal value belong, a third section to which a predetermined proportion of lower learning data except a minimal value belong, and a fourth section including only the minimal value;

summing a plurality of products of said principal component rankings and the weights of synaptic combinations of the hidden layer neurons and output layer neurons in respective sections to generate a ranking sum; and multiplying the ranking sum by the range of the individual section.

29. An economic phenomenon predicting and analyzing system according to claim 12, wherein said correlation analyzing means inputs the inputs of said neural network in the form of outputs of said hidden layer neurons and calculates an explanation variants based on a last-named of said outputs.

30. An economic phenomenon predicting and analyzing system according to claim 29, wherein said explanation variants are at least any of the following: the inputs of said neural network, differences between said moving-average values in different periods for the time series data representing the same principal economic indices and differences between said moving-average values in the same period for the time series data representing different principal economic indices.

31. An economic phenomenon predicting and analyzing method comprising the steps of:
(a) obtaining moving-average values of time series data indicating various principal economic indices for a plurality of recent predetermined periods, each of said various principal economic indices including an economic phenomenon to be predicted;
(b) obtaining differences between said moving-average values, which are obtained in an individual common period, for at least a first to an n-th order difference;
(c) removing trends from time series data indicating the economic phenomenon to be predicted by subtracting from time series data indicating the economic phenomenon to be predicted an individual moving-average value of the economic phenomenon for any of the predetermined periods;
(d) sorting said time series data indicating the economic phenomenon to be predicted, after removing trends, into patterns; and
(e) predicting the economic phenomenon, based on said moving-average values, said differences and said sorting, using a neural network including (e1) an input layer comprising a plurality of input layer neurons for inputting said moving-average values and differences, and for inputting data indicating the variations of various principal economic indices including the economic phenomenon to be predicted and said patterns as data indicating a variation patterns of the economic phenomenon, (e2) a predetermined number of hidden layers comprising a plurality hidden layer neurons, respectively, each of said input neurons making synaptic combinations with arbitrary ones of said hidden layer neurons, each synaptic combination having a weight, and (e3) an output layer comprising a predetermined number of output layer neurons, each of said hidden layer neurons making synaptic combinations with arbitrary ones of said output layer neurons, each synaptic combination having a weight, and each of said output layer neurons generating an output signal representing a result of prediction of the economic phenomenon, (e4) wherein weights of the synaptic combinations between said input layer neurons and hidden layer neurons and weights of the synaptic combinations between said hidden layer neurons and said output layer neurons are organized by learning in such a manner that when a plurality of data indicating variations of the various principal economic indices and a plurality of data indicating the variation patterns of the economic phenomenon are input to said input layer neurons, said signals output from said output layer neurons represent the result of prediction of the economic phenomenon.

32. An economic phenomenon predicting and analyzing method comprising the steps of:
(a) obtaining moving-average values of time series data indicating various principal economic indices for a plurality of recent predetermined periods, each of said various principal economic indices including an economic phenomenon to be predicted;
(b) obtaining differences between said moving-average values, which are obtained in the individual common period, for at least a first to an n-th order difference;
(c) predicting the economic phenomenon, based on said moving-average values and differences, using a neural network including (c1) an input layer having a plurality of input layer neurons for inputting said moving-average values and differences, data indicating the variations of various principal economic indices including the economic phenomenon to be predicted, (c2) a predetermined number of hidden layers having a plurality of hidden layer neurons, respectively, each of said input neurons making synaptic combination with arbitrary ones of said hidden layer neurons, each synaptic combination having a weight, and (c3) an output layer having a predetermined number of output layer neurons, each of said hidden layer neurons making a synaptic combinations with arbitrary one of said output layer neurons, each of said output layer neurons generating an output signal representing the result of prediction of the economic phenomenon, and each synaptic combination having a weight, (c4) wherein weights of the synaptic combinations between said input layer neurons and hidden layer neurons and weights of the synaptic combinations between said hidden layer neurons and said output layer neurons are organized by learning in such a manner that when a plurality of data indicating the variations of the various principal economic indices and a plurality of data indicating the variation pattern of the economic phenomenon are input to said input layer neurons, said signals output from said output layer neurons represent a result of prediction of the economic phenomenon;
(d) obtaining a plurality of principal components by a principal component analysis for the output of said hidden layer neurons; and
(e) analyzing a correlation between the variation pattern of economic phenomenon and the variation of output of said output layer neurons by analyzing the obtained principal components.

33. An economic phenomenon predicting system comprising:
(a) a predetermined number of neural networks organized to output a result of prediction of an economic phenomenon when data indicating variations of various principal economic indices including the economic phenomenon and data indicating a variation pattern of the economic phenomenon are provided as input;

(b) moving-average-value arithmetic means for obtaining moving-average values of time series data indicating various principal economic indices for a plurality of recent predetermined periods, said moving-average-value arithmetic means supplying said obtained moving-average values, as part of said data indicating the variations of the various principal economic indices including the economic phenomenon to be predicted, to said networks;

(c) difference arithmetic means for obtaining a plurality of differences between said moving-average values obtained in an individual common period, for at least from a first to an n-th difference, said difference arithmetic means supplying the obtained differences, as part of said data indicating the variations of said various principal economic indices including the economic phenomenon to be predicted, to said networks;

(d) trend removing means for removing a plurality of trends from the time series data indicating the economic phenomenon to be predicted by subtracting from said time series data an individual moving-average value of the economic phenomenon for any of the predetermined periods; and (e) pattern-sorting means for sorting said time series data indicating the economic phenomenon to be predicted into patterns, said pattern-sorting means generating output patterns, which are obtained from the sorting, as data indicating variation patterns of the economic phenomenon to said networks.

34. An economic phenomenon predicting and analyzing system comprising:

(a) a predetermined numbers of neural networks that generates a number of hidden layer outputs according to both data indicating variations of various principal indices, including an economic phenomenon to be predicted, and data indicating a variation pattern of the economic phenomenon, and so as to output signals indicating the economic phenomenon by combining said hidden layer outputs;

(b) moving-average-value arithmetic means for obtaining moving-average values of inputted time series data indicating various principal economic indices for a plurality of recent predetermined periods, said moving-average-value arithmetic means supplying said obtained moving-average values, as part of said data indicating the variations of the various principal economic indices, including the economic phenomenon to be predicted, to said networks;

(c) difference arithmetic means for obtaining a difference between said moving-average values, Which are obtained in an individual common period, for at least from a first to an n-th order difference, said difference arithmetic means including means for supplying the obtained differences, as part of said data indicating the variations of said various principal economic indices including the economic phenomenon to be predicted, to said networks;

(d) principal component arithmetic means for obtaining principal components of the hidden layer outputs by principal analysis; and (e) correlation analyzing means for analyzing a correlation between variation of the economic phenomenon to be predicted and variation of the output of said output layer neurons by analyzing the obtained principal components.

* * * * *